(12) United States Patent
Kim et al.

(10) Patent No.: US 8,199,801 B2
(45) Date of Patent: Jun. 12, 2012

(54) DTV RECEIVER AND METHOD OF PROCESSING BROADCAST SIGNAL IN DTV RECEIVER

(75) Inventors: Byoung Gill Kim, Seoul (KR); In Hwan Choi, Gyeonggi-do (KR); Woo Chan Kim, Gyeonggi-do (KR); Jae Hyung Kim, Seoul (KR); Yong Hak Suh, Seoul (KR); Hyoung Gon Lee, Seoul (KR); Jong Moon Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/227,311

(22) Filed: Sep. 7, 2011

(65) Prior Publication Data

US 2012/0057080 A1 Mar. 8, 2012

Related U.S. Application Data

(63) Continuation of application No. 11/613,923, filed on Dec. 20, 2006, now Pat. No. 8,050,316.

(60) Provisional application No. 60/867,457, filed on Nov. 28, 2006.

(30) Foreign Application Priority Data

Dec. 20, 2005 (KR) .................. 10-2005-0126484

(51) Int. Cl.
*H03H 7/30* (2006.01)

(52) U.S. Cl. ...................................... 375/229

(58) Field of Classification Search .......... 375/229, 375/233, 354
See application file for complete search history.

(56) References Cited

U.S. PATENT DOCUMENTS

| | | |
|---|---|---|
| 5,502,506 A | 3/1996 | Choi |
| 6,973,137 B2 | 12/2005 | Birru et al. |
| 7,111,221 B2 | 9/2006 | Birru et al. |
| 7,180,552 B2 | 2/2007 | Kim |
| 7,206,352 B2 | 4/2007 | Birru et al. |
| 7,327,810 B2 | 2/2008 | Kim et al. |
| 7,391,833 B2 | 6/2008 | Kim et al. |
| 7,548,582 B2 | 6/2009 | Kim et al. |
| 7,551,547 B2 | 6/2009 | Ghosh |
| 7,599,348 B2 | 10/2009 | Kang et al. |
| 2002/0168002 A1 | 11/2002 | Birru |
| 2002/0176524 A1 | 11/2002 | Popper et al. |
| 2002/0191712 A1 | 12/2002 | Gaddam et al. |
| 2002/0194570 A1 | 12/2002 | Birru et al. |
| 2004/0100587 A1 | 5/2004 | Kim |
| 2004/0105507 A1 | 6/2004 | Chang et al. |
| 2004/0125235 A1 | 7/2004 | Kim et al. |
| 2004/0174940 A1* | 9/2004 | Kim et al. ............ 375/340 |
| 2005/0162886 A1* | 7/2005 | Jeong et al. ............ 365/63 |
| 2005/0249301 A1* | 11/2005 | Jeong et al. ............ 375/265 |
| 2005/0286622 A1 | 12/2005 | Kim et al. |
| 2006/0088119 A1 | 4/2006 | Fu et al. |

(Continued)

*Primary Examiner* — Jaison Joseph
(74) *Attorney, Agent, or Firm* — Lee, Hong, Degerman, Kang & Waimey

(57) ABSTRACT

A DTV receiver includes a tuner, a demodulator, a known sequence detector, and a frequency domain equalizer. The tuner initially receives a broadcast signal including valid data in which a known data sequence is periodically repeated. The demodulator demodulates the broadcast signal, and the known sequence detector detects the known data sequence from the demodulated signal. The frequency domain equalizer compensates channel distortion of the demodulated broadcast signal in a frequency domain using the detected known data sequence. In addition, the DTV receiver may further include a time domain equalizer which compensates channel distortion of the time domain signal, or a noise canceller which removes a predicted noise from the time domain signal.

10 Claims, 8 Drawing Sheets

U.S. PATENT DOCUMENTS

| | | |
|---|---|---|
| 2006/0285608 A1 | 12/2006 | Kim et al. |
| 2007/0014379 A1* | 1/2007 | Park et al. ............ 375/295 |
| 2007/0058081 A1 | 3/2007 | Kim et al. |
| 2007/0153888 A1 | 7/2007 | Kim et al. |
| 2007/0183517 A1 | 8/2007 | Liu et al. |
| 2007/0253502 A1 | 11/2007 | Park et al. |

* cited by examiner

DTV RECEIVER AND METHOD OF PROCESSING BROADCAST SIGNAL IN DTV RECEIVER

This application is a continuation of U.S. application Ser. No. 11/613,923, filed on Dec. 20, 2006 (now U.S. Pat. No. 8,050,316), which claims the benefit of Korean Patent Application No. 10-2005-0126484, filed on Dec. 20, 2005, and U.S. Provisional Application No. 60/867,457, filed on Nov. 28, 2006, which are all hereby incorporated by reference herein in their entireties.

BACKGROUND OF THE INVENTION

1. Field of the Invention

The present invention relates to a digital broadcasting system, and more particularly, to a DTV receiver and a method of processing a broadcast signal in a DTV receiver that are used for receiving a digital broadcast signal.

2. Discussion of the Related Art

The VSB transmission mode, which is adopted as the standard for digital broadcasting in North America and the Republic of Korea, is a system that has been developed for the transmission of MPEG video/audio data. However, presently, the technology for processing digital signals is being developed at a vast rate, and, as a larger number of the population uses the Internet, digital electric appliances, computers, and the Internet are being integrated. Therefore, in order to meet with the various requirements of the users, a system that can transmit video/audio data as well as other diverse supplemental information through a digital television channel needs to be developed.

Some users may assume that supplemental data broadcasting would be applied by using a PC card or a portable device having a simple in-door antenna attached thereto. However, when used indoors, the intensity of the signals may decrease due to a blockage caused by the walls or disturbance caused by approaching or proximate mobile objects. Accordingly, the quality of the received digital signals may be deteriorated due to a ghost effect and noise caused by reflected waves. However, unlike the general video/audio data, when transmitting the supplemental data, the data that is to be transmitted should have a low error ratio. More specifically, in case of the video/audio data, errors that are not perceived or acknowledged through the eyes or ears of the user can be ignored, since they do not cause any or much trouble. Conversely, in case of the supplemental data (e.g., program execution file, stock information, etc.), an error even in a single bit may cause a serious problem. Therefore, a system highly resistant to ghost effects and noise is required to be developed.

The supplemental data are generally transmitted by a time-division method through the same channel as the MPEG video/audio data. However, with the advent of digital broadcasting, ATSC VSB digital television receivers that receive only MPEG video/audio data are already supplied to the market. Therefore, the supplemental data that are transmitted through the same channel as the MPEG video/audio data should not influence the conventional ATSC VSB receivers that are provided in the market. In other words, this may be defined as ATSC VSB compatibility, and the supplemental data broadcast system should be compatible with the ATSC VSB system. Herein, the supplemental data may also be referred to as enhanced data or EVSB data. Furthermore, in a poor channel environment, the receiving performance of the conventional ATSC VSB receiving system may be deteriorated. More specifically, resistance to changes in channels and noise is more highly required when using portable and/or mobile receivers.

SUMMARY OF THE INVENTION

Accordingly, the present invention is directed to a DTV receiver and a method of processing a broadcast signal in a DTV receiver that substantially obviate one or more problems due to limitations and disadvantages of the related art.

An object of the present invention is to provide a DTV receiver and a method of processing broadcast signal in a DTV receiver that is suitable for transmitting supplemental data and that is highly resistant to noise.

Another object of the present invention is to provide a DTV transmitter and a method of processing broadcast signal in a DTV transmitter that can regularly insert known data in a specific domain of the supplemental data and transmitting the data to a DTV receiver, thereby enhancing the receiving performance of the DTV receiver.

A further object of the present invention is to provide a DTV transmitter and a method of processing broadcast signal in a DTV transmitter that can use the regularly inserted and transmitted known data in order to enhance channel equalization performance.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a digital television (DTV) receiver includes a tuner, a demodulator, a known sequence detector, and a frequency domain equalizer. The tuner initially receives a broadcast signal including valid data (main and/or enhanced data) in which a known data sequence is periodically repeated. The demodulator demodulates the broadcast signal by performing at least one of carrier and time recovery. The known sequence detector detects the known data sequence from the signal outputted from the tuner or demodulator. The frequency domain equalizer compensates channel distortion of the demodulated broadcast signal in a frequency domain using the known data sequence detected by the known sequence detector.

The frequency domain equalizer includes a first transformer, a channel estimator, a second transformer, a coefficient calculator, a compensator, and a third transformer. The first transformer converts the demodulated broadcast signal into first frequency domain data. The channel estimator estimates a channel impulse response of the demodulated signal using the detected known data sequence, and the second transformer converts the estimated channel impulse response into second frequency domain data. The coefficient calculator calculates equalization coefficients using the second frequency domain data. The compensator compensates channel distortion of the first frequency domain data by multiplying the first frequency data with the equalization coefficients. The third transformer finally converts the first frequency domain data compensated by the compensator into a time domain signal.

In addition, the DTV receiver according to the present invention may further include a time domain equalizer for compensating channel distortion of the time domain signal. The time domain equalizer may include a decision unit, a feedback filter, and an adder. The decision unit generates a decision value which is the closest reference signal level to an output of the time domain equalizer. The feedback filter performs feedback filtering on the decision value, the adder adds the filtered decision value to the time domain signal to compensate the channel distortion of the time domain signal.

Furthermore, the DTV receiver may further include a noise canceller for removing a noise from the time domain signal. It may include a decision unit, a noise predictor, and a subtracter. The decision unit generates a decision value which is the closest reference signal to an output of the noise canceller. The noise predictor generates a predicted noise based on the time domain signal outputted from the third transmitter and the decision value. The subtracter subtracts the predicted noise from the time domain signal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

In the present invention, the enhanced data may either consist of data including information such as program execution files, stock information, weather forecast, and so on, or consist of video/audio data. Additionally, the known data refer to data already known based upon a pre-determined agreement between the transmitter and the receiver. Furthermore, the main data consist of data that can be received from the conventional receiving system, wherein the main data include video/audio data.

The present invention relates to regularly inserting known data in a specific domain of a data packet and transmitting the processed data packet and to using the regularly inserted and transmitted known data for channel equalization, thereby enhancing the equalizing performance.

Figure 1:
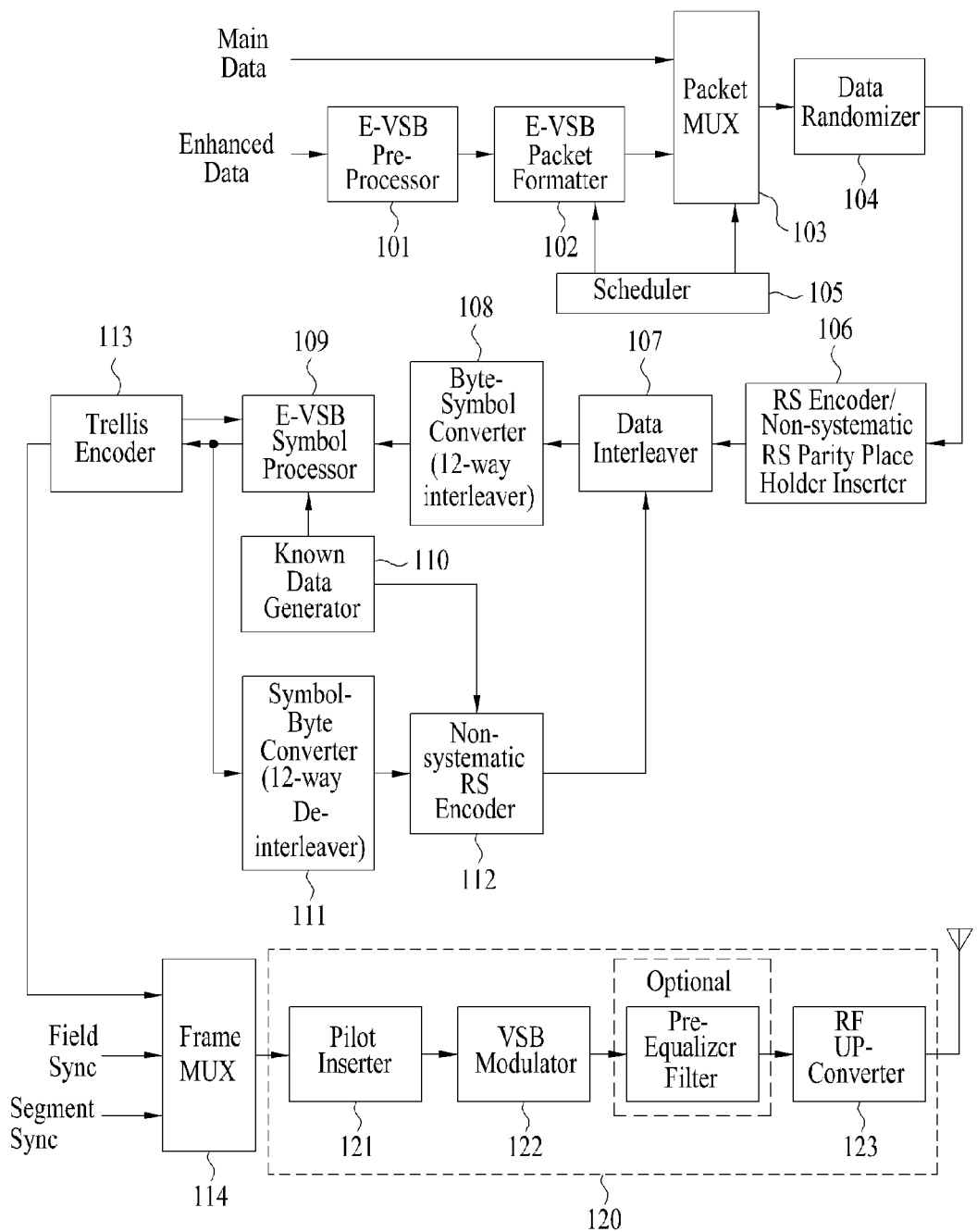
FIG. 1 illustrates a block view of a digital broadcast transmitting system according to the present invention.

FIG. 1 illustrates an example of a digital broadcast transmitting system for regularly inserting and transmitting known data. The digital broadcast transmitting system shown in FIG. 1 is only exemplary for the description of the present invention. In other words, any type of transmitter that can regularly insert and transmit a known data sequence may be used in the present invention, and the type of transmitter is not limited to the example shown in FIG. 1. Referring to FIG. 1, the digital broadcast transmitting system includes an E-VSB pre-processor 101, an E-VSB packet formatter 102, a packet multiplexer 103, a data randomizer 104, a scheduler 105, a Reed-Solomon (RS) encoder and parity place holder inserter 106, a data interleaver 107, a byte-symbol converter 108, an E-VSB symbol processor 109, a known data generator 110, a symbol-byte converter 111, a non-systematic RS encoder 112, a trellis encoder 113, a frame multiplexer 114, and a transmitter 120.

In the present invention having the above-described structure, a main data packet is outputted to the packet multiplexer 103 in transport stream (TS) packet units, and enhanced data are outputted to the E-VSB pre-processor 101. The E-VSB pre-processor 101 pre-processes the enhanced data, such as encoding additional error correction, interleaving, and expanding data bytes by inserting null data, and then outputs the pre-processed enhanced data to the E-VSB packet formatter 102. Based upon the control of the scheduler 105, the E-VSB packet formatter 102 multiplexes the pre-processed enhanced data and a known data place holder having the null data inserted therein, thereby configuring a group. The data within the group are then divided into 184-byte unit enhanced data packets, and a 4-byte MPEG header is added to the beginning of the enhanced data packet, thereby outputting a 188-byte enhanced data packet (i.e., a MPEG compatibility packet).

Herein, the E-VSB packet formatter 102 decides the known data place holder so that, when a receiving end (or receiver) receives the known data in accordance with the control of the scheduler 105, a known data sequence having the same length as the received known data can be received regularly. The output of the E-VSB packet formatter 102 is inputted to the packet multiplexer 103. The packet multiplexer 103 time-division multiplexes the main data packet and the enhanced data packet group in transport stream (TS) packet units and outputs the multiplexed TS packet in accordance with the control of the scheduler 105. More specifically, the scheduler 105 generates and outputs a control signal so that the packet formatter 102 can multiplex the enhanced data and the known data place holder.

The output of the packet multiplexer 103 is inputted to the data randomizer 104. The data randomizer 104 discards (or deletes) the MPEG synchronization data byte and randomizes the remaining 187 bytes by using uses a pseudo random byte that is generated by the data randomizer 104. Thereafter, the processed data are inputted to the RS encoder/parity place holder inserter 106. Herein, when the randomized data correspond to the main data packet, the RS encoder/parity place holder inserter 106 performs a systematic RS coding process. Alternatively, when the randomized data correspond to the enhanced data packet, the RS encoder/parity place holder inserter 106 performs a non-systematic RS parity place holder insertion process. The output of the RS encoder/parity place holder inserter 106 is inputted to the data interleaver 107. Subsequently, the data interleaver 107 receives the processed data, which are then interleaved and outputted. At this point, the data interleaver 107 receives a RS parity byte that has been newly calculated and outputted by the non-systematic RS encoder. Herein, the newly received RS parity byte is outputted instead of the non-systematic RS parity place holder which has not yet been outputted.

One byte outputted from the data interleaver 107 is converted to four symbols by the byte-symbol converter 108, which are then outputted to the E-VSB symbol processor 109. Herein, one symbol is configured of two bits. Furthermore, the known data generated from the known data generator 110 are also outputted to the E-VSB symbol processor 109. Herein, the known data generated from a symbol domain correspond to known data symbols. Since the receiver uses the known data in the symbol domain, it is more effective to generate a known data symbol sequence having the characteristics desired by the symbol domain.

Meanwhile, when the data being inputted to the E-VSB symbol processor 109 correspond to the known data place holder that has been converted to symbols by the byte-symbol converter 108, the known data place holder is replaced with the known data generated from the known data generator 110. Additionally, a data symbol is generated and outputted at the beginning of the known data sequence, so that the memory of the trellis encoder 113 can be initialized to a pre-decided status. In order to do so, a value of the memory included in the trellis encoder 113 should be received from the E-VSB symbol processor 109.

The memory value of the trellis encoder 113 may also be used in additional signal processing for the enhanced data symbols. Also, the memory of the trellis encoder 113 is initialized at the beginning of the known data sequence because a wide range of output sequences may be outputted in accordance with the memory status of the trellis encoder 113 even though the known data sequence is inputted to the trellis encoder 113. Therefore, the memory status of the trellis encoder 113 is first initialized to a pre-decided value. Subsequently, when the known data are inputted, a known data output sequence may also be obtained from the output of the trellis encoder 113.

The output symbols of the E-VSB symbol processor 109 are inputted to the trellis encoder 113, and the symbol are then trellis-encoded. The trellis encoder 113 pre-codes the data being inputted as the upper bit of the symbols outputted from the E-VSB symbol processor 109. The trellis encoder 113 also trellis-encodes the data being inputted as the lower bit of the symbols outputted from the E-VSB symbol processor 109. Then, the trellis encoder 113 outputs the processed data to the frame multiplexer 114. Meanwhile, since the E-VSB symbol processor 109 receives and processes the symbols each configured of two bits and then outputs the processed symbol, which is also configured of two bits, the symbol-byte converter 111 should convert the received symbols to one byte. This is to allow the non-systematic RS encoder 112 to recalculate the RS parity from the output of the E-VSB symbol processor 109. More specifically, the symbol-byte converter 111 converts the input symbols to byte unit data, which are then outputted to the non-systematic RS encoder 112.

The non-systematic RS encoder 112 calculates 20 bytes of RS parity for the enhanced data packet configured of 187 data bytes. Thereafter, the non-systematic RS encoder 112 outputs the calculated RS parity to the data interleaver 107. The data interleaver 107 receives the RS parity bytes calculated and outputted by the non-systematic RS encoder 112. Then, the received RS parity bytes are outputted instead of the non-systematic RS parity place holders, which have not yet been outputted. The non-systematic RS-coding process is performed because the enhanced data symbols and the known data place holders have been changed to different values by the E-VSB symbol processor 109. This is to prevent any decoding error from occurring, when the RS-decoding process is performed by the conventional ATSC VSB receiver. In other words, this is to provide backward compatibility with the conventional ATSC VSB receiver.

Meanwhile, the non-systematic RS encoder 112 receives the output of the known data generator 110 so that the non-systematic RS encoder 112 can receive in advance the known data that are outputted later than the RS parity bytes from the symbol-byte converter 111. The frame multiplexer 114 inserts 4 segment synchronization symbols after each output symbol of the trellis encoder 113, so as to configure a data segment of 832 symbols. Also, the frame multiplexer 114 inserts one field synchronization symbol after each 312 data segment, so as to configure a data field. Then, the frame multiplexer 114 outputs the newly configured data segment and data field to the transmitter 120. The transmitter 120 inserts a pilot signal in the output of the frame multiplexer 114 having the segment synchronization signal and the field synchronization signal inserted therein. Then, the processed data are VSB modulated and converted to radio frequency (RF) signals, which are then transmitted through an antenna. In order to do so, the transmitter 120 includes a pilot inserter 121, a VSB modulator 122, and a RF-up converter 123. Herein, a pre-equalizer filter may be optionally included.

Figure 2:
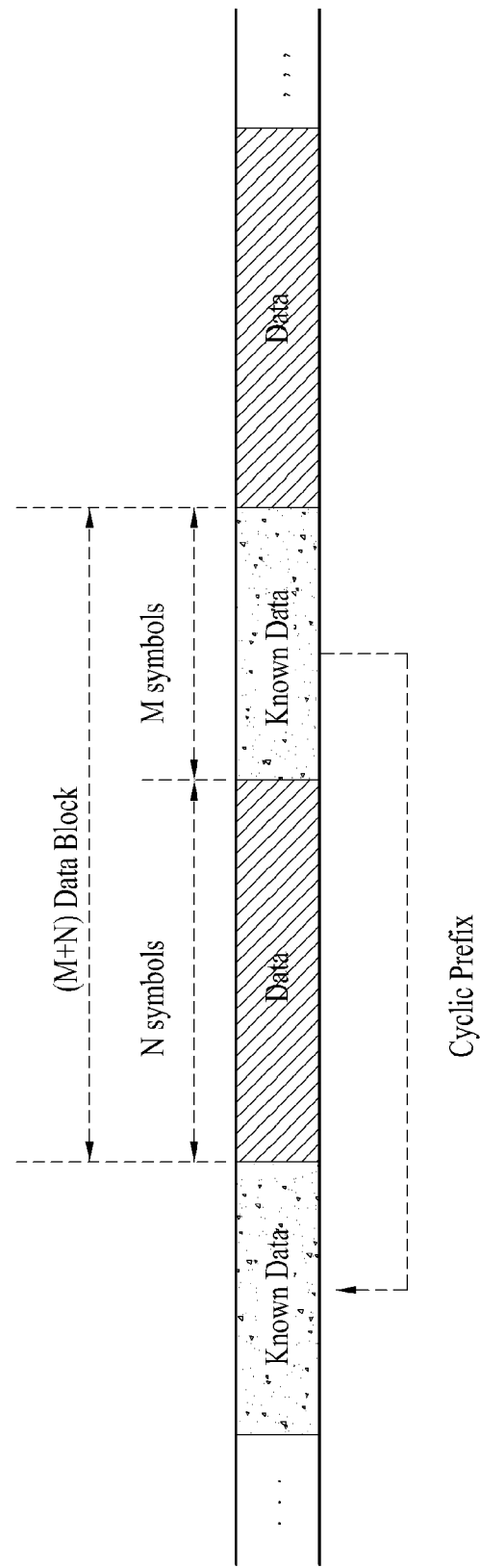
FIG. 2 illustrates an example of a data structure having known data regularly inserted in valid data according to the present invention.

As described above, the digital broadcast transmitting system according to the present invention may regularly insert known data in a VSB data frame. FIG. 2 illustrates an exemplary a data structure of a VSB signal that regularly inserts and transmits known data sequences having the same pattern in between actual data. Referring to FIG. 2, M represents the number of known data symbols, and N represents the number of symbols corresponding to valid data. Therefore, for each (M+N) symbol cycle, M number of known data symbols are inserted and transmitted. Herein, N may correspond to one of enhanced data, main data, and a combination of enhanced data and main data. In the present invention, in order to be differentiated with the known data, N will be referred to as valid data for simplicity.

Accordingly, when the known data are regularly inserted in the valid data as described above, the channel equalizer included in the digital broadcast receiver used the inserted known data as a training sequence, so as to be used either for an accurate decision value or for estimating an impulse response of a channel. Meanwhile, when the same known data are regularly inserted, the known data interval may be used as a guard interval in a frequency domain channel equalizer according to the present invention. The guard interval prevents interference that occurs between blocks due to a multiple path channel. This is because the known data of the known data section located behind the data block corresponding to the (M+N) symbol may be considered as being copied in front of the data block corresponding to the (M+N) symbol, as shown in FIG. 2.

The above-described structure is referred to as a cyclic prefix. This structure provides circular convolution to an impulse response in a time domain between a data block transmitted from the digital broadcast transmitting system and a channel. Accordingly, this facilitates the channel equalizer of a digital broadcast receiving system to perform channel equalization in a frequency domain by using a fast fourier transform (FFT) and an inverse fast fourier transform (IFFT). More specifically, when viewed in the frequency domain, the data block received by the receiving system is expressed as a multiplication of the data block and the channel impulse response. Therefore, when performing the channel equalization, by multiplying the inverse of the channel in the frequency domain, the channel equalization may be performed more easily.

Figure 3:
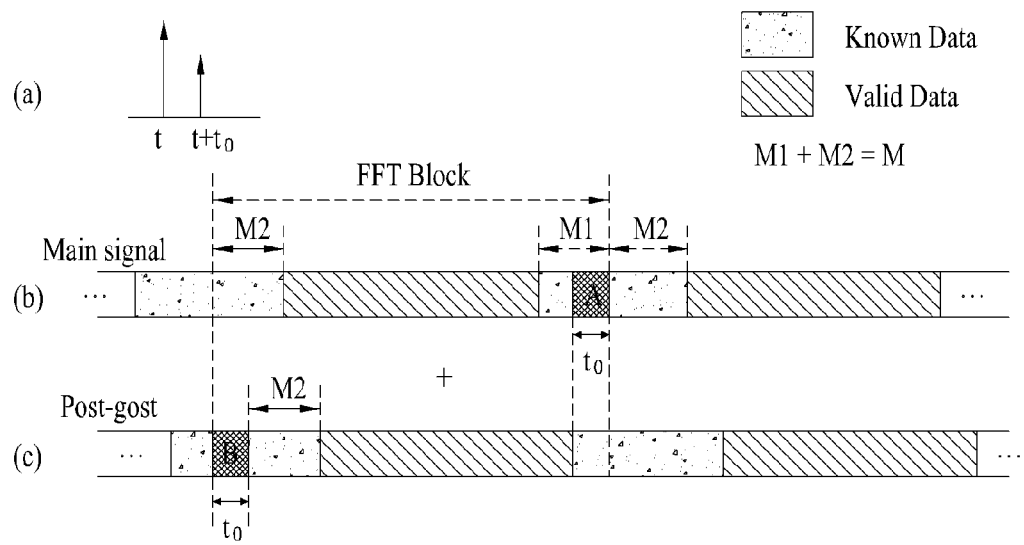
FIG. 3(a) to FIG. 3(c) illustrate correlations between a main signal and a ghost signal when a post-ghost exists.
Figure 4:
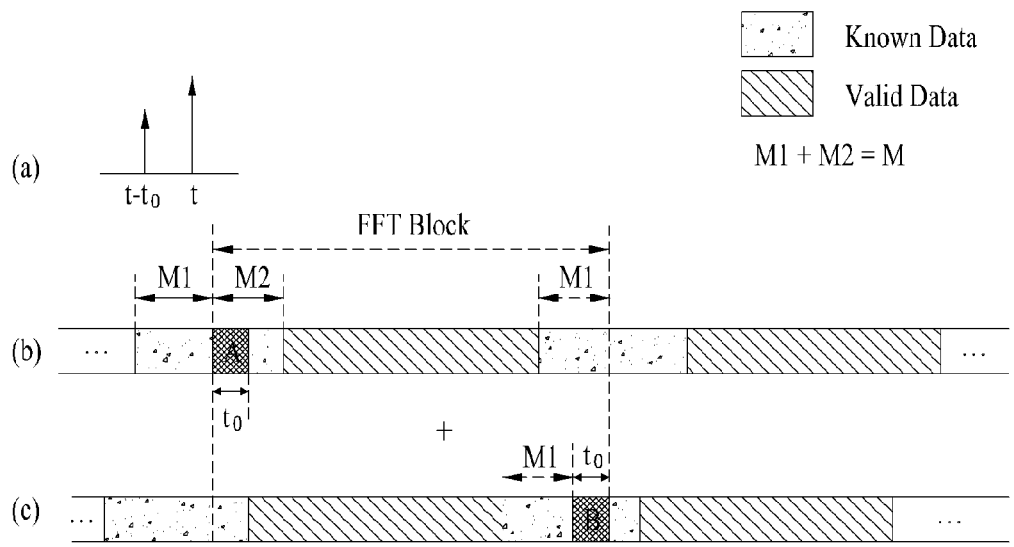
FIG. 4(a) to FIG. 4(c) illustrate correlations between a main signal and a ghost signal when a pre-ghost exists.

FIG. 3 and FIG. 4 illustrate examples of the known data section acting as a guard section in a multiple path channel environment, thereby preventing interference in adjacent (or neighboring) blocks. Referring to FIG. 3 and FIG. 4, the path having the largest amount of energy will be referred to as a main path for simplicity. Herein, as shown in FIG. 3(a), a ghost being received after the main path is defined as a post-ghost. Alternatively, as shown in FIG. 4(a), a ghost being received before the main path is defined as a pre-ghost. Referring to the drawings, assuming that both the post-ghost and the pre-ghost exist, the FFT block which corresponds to a section performing FFT operations is set to have a guard section located both in front of and behind the valid data. Herein, the known data located in front of the valid data within the FFT block is referred to as M2, and the known data located behind the valid data within the FFT block is referred to as M1.

FIG. 3 illustrates correlations between a main signal and a ghost signal when a post-ghost exists. More specifically, FIG. 3(b) illustrates an example of a main signal, and FIG. 3(c) illustrates an example of the post-ghost signal. Referring to FIG. 3, when a time difference between the main signal and a ghost is t0, and when t0 is smaller than M2, the known data pattern that is regularly transmitted is identical. Therefore, signal B which is added to the main signal within the FFT block by the ghost corresponds to the same data as the end portion A of the main signal. More specifically, since a signal having a circularly shifted data block is added to the current data block of the main signal within the FFT block, interference from an adjacent data block may be prevented. In other words, the effect (or influence) of the ghost is shown in a circular convolution form within the time domain of the main signal and an impulse response of a channel.

FIG. 4 illustrates correlations between a main signal and a ghost signal when a pre-ghost exists. More specifically, FIG. 4(b) illustrates an example of a main signal, and FIG. 4(c) illustrates an example of the pre-ghost signal. Referring to FIG. 4, which is similar to the example of the post-ghost shown in FIG. 3, when the time difference t0 between the main signal and the ghost is smaller than M1, the effect (or influence) of the ghost is shown in a circular convolution form of the main signal and the impulse response of a channel.

As described above, when the time difference between the main signal and the pre-ghost is smaller than the M1 symbol time, or when the time difference between the main signal and the post-ghost is smaller than the M2 symbol time, the effect of the ghost is shown within the FFT block in a circular convolution form. More specifically, when a delay spread of a multiple path (or ghost) is smaller than the guard section, the effect of the multiple path becomes a circular convolution form of the valid data block (or FFT block) and the channel impulse response within the time domain. Accordingly, in the frequency domain, the effect of the multiple path is shown as a multiplication of the data block and the channel impulse response. Therefore, by using such characteristics channel equalization may be easily performed in the frequency domain. Thus, the structure of the channel equalization may be simplified.

Figure 5:
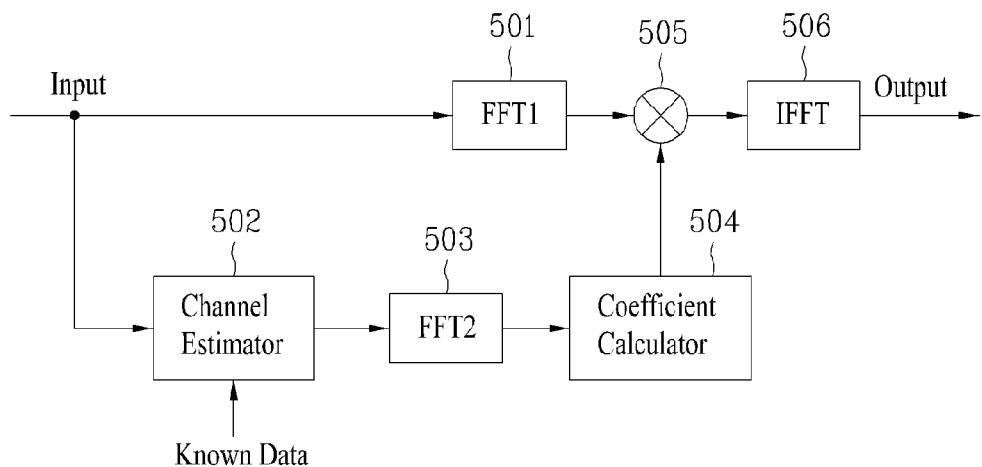
FIG. 5 illustrates a block view of a channel equalization device according to a first embodiment of the present invention.

FIG. 5 illustrates a block view of an example of a frequency domain equalizer according to the present invention. The frequency domain equalizer includes a first fast fourier transform (FFT) unit 501, a channel estimator 502, a second FFT unit 503, a coefficient calculator 504, a multiplier 505, and an inverse fast fourier transform (IFFT) unit 506. More specifically, when a series of identical known data sequences is regularly inserted in the valid data sequence and then transmitted, the first FFT unit 501 performs FFT by FFT block units on the received data. Then, the first FFT unit 501 converts the processed data to frequency domain data, which are then outputted to the multiplier 505. Herein, assuming that both post-ghost and pre-ghost exist, the FFT block section is set to have part of the known data corresponding to the known data section positioned both before (or in front of) and after (or behind) the valid data.

The channel estimator 502 uses the data received during the known data section and the known data, which are known by the receiver according to an agreement between the receiver and the transmitter, in order to estimate a channel. Then, the channel estimator 502 outputs the estimated channel to the second FFT unit 503. The known data section may be known by a synchronization recovery process performed by a synchronization recovery unit (not shown) located before the channel equalization device. More specifically, the channel estimator 502 performs the channel estimation process only during the known data section. The channel estimator 502 estimates an impulse response of a discrete equalization channel through which a signal transmitted from the transmitter is assumed to have passed during the known data section. Thereafter, the channel estimator 502 outputs the estimated result to the second FFT unit 503.

The second FFT unit 503 performs a FFT process on the estimated channel and converts the processed channel to the frequency domain. Thereafter, the processed channel is outputted to the coefficient calculator 504. The coefficient calculator 504 uses the channel impulse response of the frequency domain to calculate the equalizer coefficient and outputs the calculated result to the multiplier 505. The multiplier 505 multiplies the output of the coefficient calculator 504 and the output of the first FFT unit 501 after each frequency bin and, then, outputs each multiplied result to the IFFT unit 506. The IFFT unit 506 performs an IFFT process of the output (or result) of the multiplier 505, thereby converting the multiplied result to a time domain signal.

The coefficient calculator 504 of FIG. 5 may calculate the equalizer coefficient by using a zero forcing method, which simply calculates the inverse of a channel. Alternatively, the coefficient calculator 504 may also calculate the equalizer coefficient by using a minimum mean squared error (MMSE) method, which estimates the amount of noise in the channel so as to minimize a mean squared error corresponding to the output of the equalizer. As shown in FIG. 5, when equalization is performed in the frequency domain, the distortion of data caused by a multiple path may be compensated. However, a white noise element that is added to the output of the multiple path channel is amplified by the frequency domain equalizer, thereby changing to a colored noise. By removing the colored noise that has been amplified as described above, the equalization performance of the frequency domain channel equalizer may be enhanced.

Figure 6:
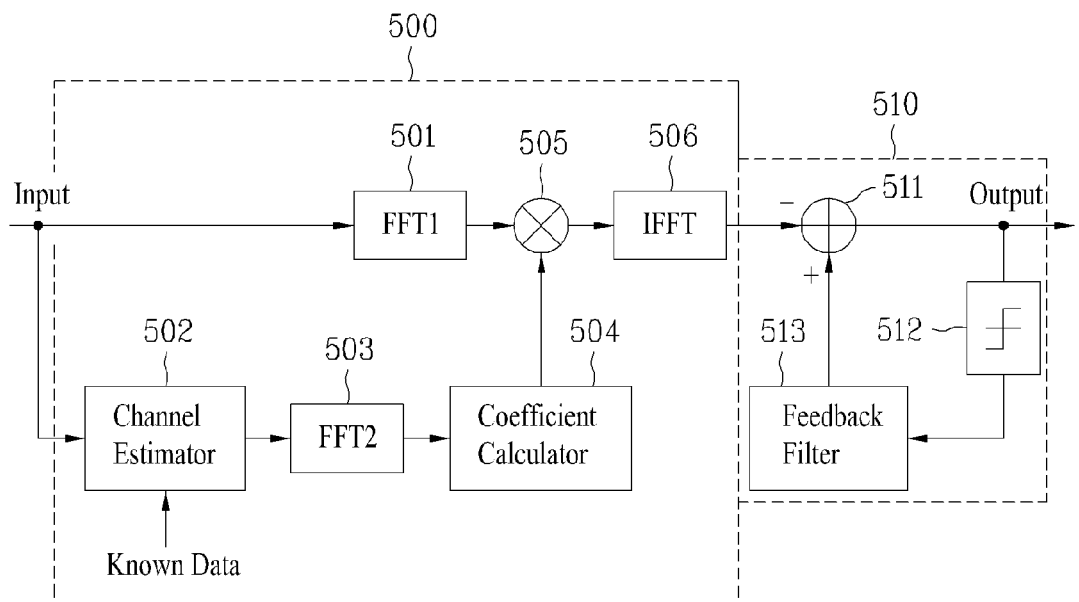
FIG. 6 illustrates a block view of a channel equalization device according to a second embodiment of the present invention.
Figure 7:
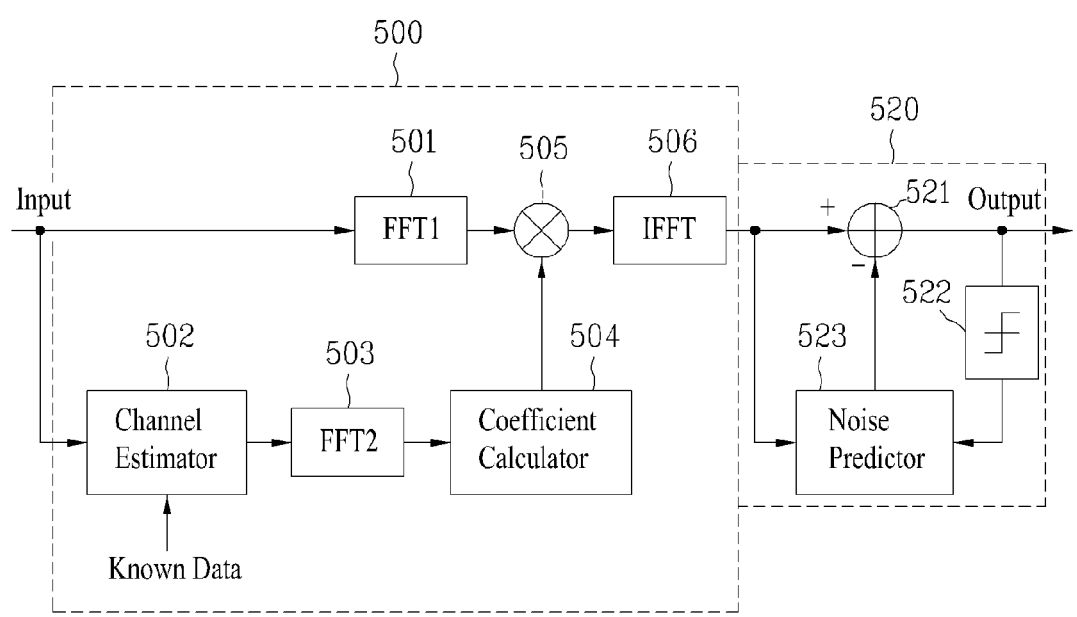
FIG. 7 illustrates a block view of a channel equalization device according to a third embodiment of the present invention.

FIG. 6 and FIG. 7 illustrate exemplary structures of a channel equalizer that is used for resolving noise amplification problems caused by the frequency domain equalizer as described above. FIG. 6 illustrates a block view showing the channel equalization device having a time domain equalizer 510 added to the frequency domain equalizer shown in FIG. 5. Herein, the time domain equalizer 510 includes an adder 511, a decision device 512, and a feedback filter 513. More specifically, the data that are equalized by the frequency domain equalizer 500 and converted to time domain data, as shown in FIG. 5, are inputted to the adder 511 of the time domain equalizer 510. The adder 511 then adds the output of the frequency domain equalizer 500 and the output of the feedback filter 513. Thereafter, the added result is outputted for data recovery and simultaneously outputted to the decision device 512.

The decision device 512 compares the output signal outputted from adder 511 with a predetermined reference signal level. Accordingly, the reference signal level that is the nearest to the output signal of the adder 511 is decided and outputted as the decision value. Subsequently, the feedback filter 513 receives the decision value of the decision device 512, so as to perform a filtering process in the time domain. Then, the processed decision value is outputted to the adder 511. At this point, if the decision is accurately made by the decision device 512, since the decision value having the noise removed from the output element of the frequency domain equalizer 500 is re-inputted as the input of the feedback filter 513, amplification of the noise does not occur. Therefore, the equalization performance is more excellent than the frequency domain equalizer 500 of FIG. 5.

FIG. 7 illustrates a block view showing the channel equalization device having a noise remover 520 added to the frequency domain equalizer 500 shown in FIG. 5. Herein, the noise remover 520 includes a subtracter 701, a decision device 522, and a noise predictor 523. More specifically, the data that have been equalized by the frequency domain channel equalizer 500 shown in. FIG. 5 and converted to time domain data are inputted to the subtracter 521 of the noise remover 520. The subtracter 521 removes the noise, which is predicted by the noise predictor 523, from the signal equalized in the frequency domain. Then, the signal having the amplified noise removed therefrom is outputted for data recovery and simultaneously outputted to the decision device 522.

The decision device 522 outputs a decision value closest to the output of the subtracter 521 to the noise predictor 523. The noise predictor 523 removes the output of the decision device 522 from the signal that has been converted to the time domain by the frequency domain equalizer 500, so as to calculate the noise element. Thereafter, the calculated noise element is used as an input of a filter within the noise predictor 523. The noise predictor 523 uses the filter to predict the colored noise element included in the output symbol of the current frequency domain equalizer 500. Then, the predicted colored noise element is outputted to the subtracter 521. Subsequently, the subtracter 521 removes the noise element predicted by the noise predictor 523 from the output of the frequency domain equalizer 500, thereby outputting the final data.

Figure 8:
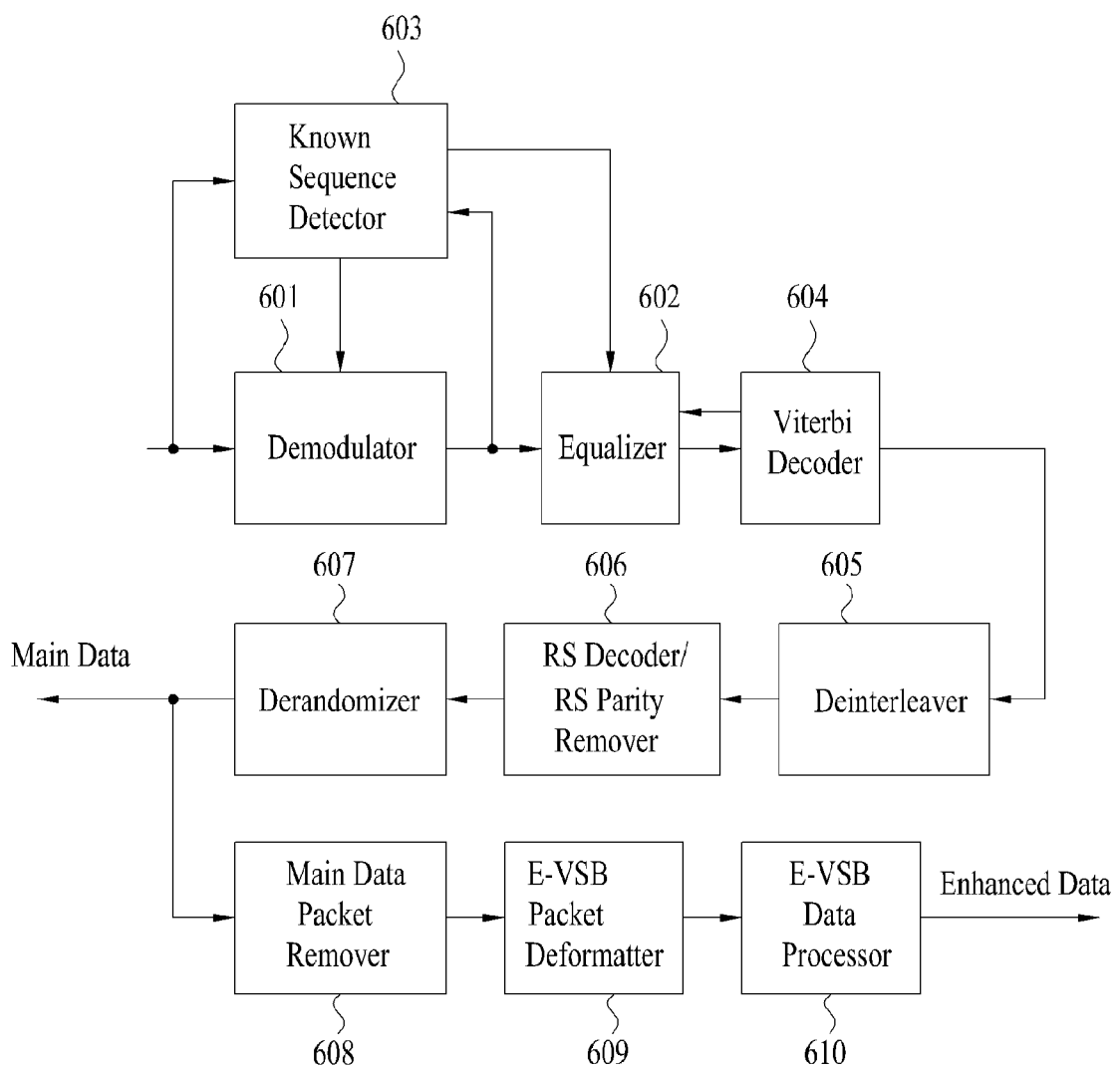
FIG. 8 illustrates a block view of a demodulating unit having the channel equalization device according to the present invention applied therein.

FIG. 8 illustrates a block view of a demodulating unit having the channel equalization device shown in FIG. 5 to FIG. 7 applied therein. The demodulating unit uses the known data information inserted in an enhanced data section and transmitted by the transmitting system, so as to restore the carrier wave synchronization, restore the frame synchronization, and perform channel equalization, thereby enhancing the receiving performance of the present invention. The demodulating unit shown in FIG. 8 is merely exemplary and the scope of the present invention is not limited to the example set forth herein.

Referring to FIG. 8, the demodulating unit includes a VSB demodulator 601, an equalizer 602, a known data detector 603, a Viterbi decoder 604, a data deinterleaver 605, a RS decoder/non-systematic RS parity remover 606, and a derandomizer 607. The digital broadcast receiving system further includes a main data packet remover 608, an E-VSB packet deformatter 609, and an E-VSB data processor 610.

More specifically, the received data through a tuner inputs to the VSB demodulator 601 and the known data detector 603. The VSB demodulator demodulates the tuned channel frequency so as to perform carrier wave recovery and timing recovery, thereby creating a baseband signal. Then, the VSB demodulator 601 outputs the created baseband signal to the equalizer 602 and the known data detector 603. The equalizer 602 uses the channel equalization device shown in FIG. 5 to FIG. 7 so as to compensate for any channel distortion included in the demodulated signal. Thereafter, the equalizer 602 outputs the processed signal to the Viterbi decoder 604.

At this point, the known data detector 603 detects the known data symbol sequence inserted from the transmitter from the input/output data of the VSB demodulator 601 (i.e., the data prior to demodulation or the data after demodulation). Then, the known data detector 603 outputs the detected sequence to the VSB demodulator 601 and the equalizer 602. When the VSB demodulator 601 uses the known data symbol sequence during the timing recovery or the carrier wave recovery, the demodulating performance may be enhanced. Similarly, when the equalizer 602 uses the known data symbol sequence, the equalization performance may be enhanced.

The Viterbi decoder 604 Viterbi-decodes the main symbol and the enhanced data symbol outputted from the equalizer 602, so as to convert the symbols into data bytes, thereby outputting the newly converted data bytes to the deinterleaver 605. The 8-level value decided by the Viterbi decoder 604 is provided to the equalizer 602 so as to enhance the equalization performance. The deinterleaver 605 performs the inverse operation of the data interleaver of the transmitting system and, then, outputs the processed data to the RS decoder/non-systematic RS parity remover 606. If the received packet is the main data packet, the RS decoder/non-systematic RS parity remover 606 RS-decodes the received packet. Alternatively, if the received packet is the enhanced data packet, the RS decoder/non-systematic RS parity remover 606 removes the non-systematic RS parity byte from the received packet. Thereafter, the processed packet is outputted to the derandomizer 607.

The derandomizer 607 performs an inverse process of the randomizer so as to process the output of the RS decoder/non-systematic RS parity remover 606. Subsequently, the derandomizer 607 inserts a MPEG synchronization data byte at the beginning of each packet and outputs the processed packet in 188-byte units. The output of the derandomizer 607 is outputted to the main MPEG decoder (not shown) and to the main data packet remover 608 at the same time.

Meanwhile, the main data packet remover 608 removes the 188-byte unit main data packet from the data outputted from the derandomizer 607 and outputs the processed data to the E-VSB packet deformatter 609. Subsequently, the E-VSB packet deformatter 609 removes (or discards) the 4-byte MPEG header byte and the known data byte that have been inserted by the E-VSB packet formatter of the transmitting system, and also removes the null bit or repetition bit that has been inserted for the byte expansion from the processed data. Thereafter, the E-VSB packet deformatter 609 outputs the processed data to the E-VSB data processor 610. The E-VSB data processor 610 performs an inverse process of the E-VSB pre-processor 101 of the transmitting system, so as to process the data outputted from the E-VSB packet deformatter 609. Subsequently, the E-VSB data processor 610 outputs the final output data.

Figure 9:
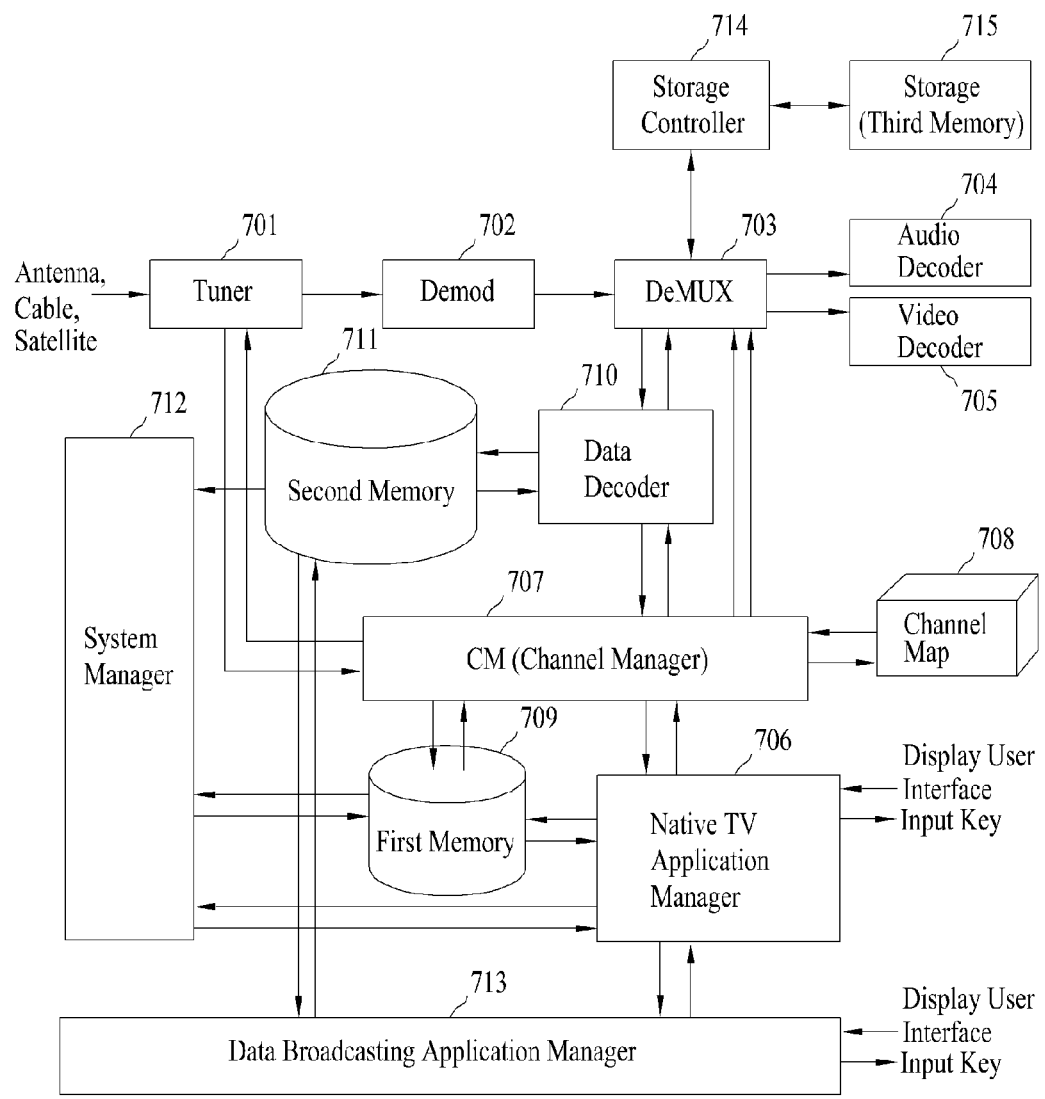
FIG. 9 illustrates a block view showing the structure of a digital broadcast (or television) receiver according to an embodiment of the present invention.

FIG. 9 illustrates a block view showing the structure of a digital broadcast receiver according to an embodiment of the present invention. Referring to FIG. 9, the digital broadcast receiver includes a tuner 701, a demodulating unit 702, a demultiplexer 703, an audio decoder 704, a video decoder 705, a native TV application manager 706, a channel manager 707, a channel map 708, a first memory 709, a data decoder 710, a second memory 711, a system manager 712, a data broadcasting application manager 713, a storage controller 714, and a third memory 715. Herein, the third memory 715 is a mass storage device, such as a hard disk drive (HDD) or a memory chip. The tuner 701 tunes a frequency of a specific channel through any one of an antenna, cable, and satellite. Then, the tuner 701 down-converts the tuned frequency to an intermediate frequency (IF), which is then outputted to the demodulating unit 702. At this point, the tuner 701 is controlled by the channel manager 707. Additionally, the result and strength of the broadcast signal of the tuned channel are also reported to the channel manager 707. The data that are being received by the frequency of the tuned specific channel include main data, enhanced data, and table data for decoding the main data and enhanced data.

In the embodiment of the present invention, examples of the enhanced data may include data provided for data service, such as Java application data, HTML application data, XML data, and so on. The data provided for such data services may correspond either to a Java class file for the Java application, or to a directory file designating positions (or locations) of such files. Furthermore, such data may also correspond to an audio file and/or a video file used in each application. The data services may include weather forecast services, traffic information services, stock information services, services providing information quiz programs providing audience participation services, real time poll, user interactive education programs, gaming services, services providing information on soap opera (or TV series) synopsis, characters, original sound track, filing sites, services providing information on past sports matches, profiles and accomplishments of sports players, product information and product ordering services, services providing information on broadcast programs by media type, airing time, subject, and so on. The types of data services described above are only exemplary and are not limited only to the examples given herein. Furthermore, depending upon the embodiment of the present invention, the enhanced data may correspond to meta data. For example, the meta data use the XML application so as to be transmitted through a DSM-CC protocol.

The demodulating unit 702 performs VSB-demodulation and channel equalization on the signal being outputted from the tuner 701, thereby identifying the main data and the enhanced data. Thereafter, the identified main data and enhanced data are outputted in TS packet units. An example of the demodulating unit 702 is shown in FIG. 8. The demodulating unit shown in FIG. 8 is merely exemplary and the scope of the present invention is not limited to the example set forth herein. In the embodiment given as an example of the present invention, only the enhanced data packet outputted from the demodulating unit 702 is inputted to the demultiplexer 703. In this case, the main data packet is inputted to another demultiplexer (not shown) that processes main data packets. Herein, the storage controller 714 is also connected to the other demultiplexer in order to store the main data after processing the main data packets. The demultiplexer of the present invention may also be designed to process both enhanced data packets and main data packets in a single demultiplexer.

The storage controller 714 is interfaced with the demultiplexer so as to control instant recording, reserved (or pre-programmed) recording, time shift, and so on of the enhanced data and/or main data. For example, when one of instant recording, reserved (or pre-programmed) recording, and time shift is set and programmed in the receiving system (or receiver) shown in FIG. 9, the corresponding enhanced data and/or main data that are inputted to the demultiplexer are stored in the third memory 715 in accordance with the control of the storage controller 714. The third memory 715 may be described as a temporary storage area and/or a permanent storage area. Herein, the temporary storage area is used for the time shifting function, and the permanent storage area is used for a permanent storage of data according to the user's choice (or decision).

When the data stored in the third memory 715 need to be reproduced (or played), the storage controller 714 reads the corresponding data stored in the third memory 715 and outputs the read data to the corresponding demultiplexer (e.g., the enhanced data are outputted to the demultiplexer 703 shown in FIG. 9). At this point, according to the embodiment of the present invention, since the storage capacity of the third memory 715 is limited, the compression encoded enhanced data and/or main data that are being inputted are directly stored in the third memory 715 without any modification for the efficiency of the storage capacity. In this case, depending upon the reproduction (or reading) command, the data read from the third memory 715 pass through the demultiplexer so as to be inputted to the corresponding decoder, thereby being restored to the initial state.

The storage controller 714 may control the reproduction (or play), fast-forward, rewind, slow motion, instant replay functions of the data that are already stored in the third memory 715 or presently being buffered. Herein, the instant replay function corresponds to repeatedly viewing scenes that the viewer (or user) wishes to view once again. The instant replay function may be performed on stored data and also on data that are currently being received in real time by associating the instant replay function with the time shift function. If the data being inputted correspond to the analog format, for example, if the transmission mode is NTSC, PAL, and so on, the storage controller 714 compression encodes the inputted data and stored the compression-encoded data to the third memory 715. In order to do so, the storage controller 714 may include an encoder, wherein the encoder may be embodied as one of software, middleware, and hardware. Herein, an MPEG encoder may be used as the encoder according to an embodiment of the present invention. The encoder may also be provided outside of the storage controller 714.

Meanwhile, in order to prevent illegal duplication (or copies) of the input data being stored in the third memory 715, the storage controller 714 scrambles the input data and stores the scrambled data in the third memory 715. Accordingly, the storage controller 714 may include a scramble algorithm for scrambling the data stored in the third memory 715 and a descramble algorithm for descrambling the data read from the third memory 715. Herein, the definition of scramble includes encryption, and the definition of descramble includes decryption. The scramble method may include using an arbitrary key (e.g., control word) to modify a desired set of data, and also a method of mixing signals.

Meanwhile, the demultiplexer 703 receives the real-time data outputted from the demodulating unit 702 or the data read from the third memory 715 and demultiplexes the received data. In the example given in the present invention, the demultiplexer 703 performs demultiplexing on the enhanced data packet. Therefore, in the present invention, the receiving and processing of the enhanced data will be described in detail. It should also be noted that a detailed description of the processing of the main data will be omitted for simplicity starting from the description of the demultiplexer 703 and the subsequent elements.

The demultiplexer 703 demultiplexer enhanced data and program specific information/program and system information protocol (PSI/PSIP) tables from the enhanced data packet inputted in accordance with the control of the data decoder 710. Thereafter, the demultiplexed enhanced data and PSI/PSIP tables are outputted to the data decoder 710 in a section format. In order to extract the enhanced data from the channel through which enhanced data are transmitted and to decode the extracted enhanced data, system information is required. Such system information may also be referred to as service information. The system information may include channel information, event information, etc. In the embodiment of the present invention, the PSI/PSIP tables are applied as the system information. However, the present invention is not limited to the example set forth herein. More specifically, regardless of the name, any protocol transmitting system information in a table format may be applied in the present invention.

The PSI table is an MPEG-2 system standard defined for identifying the channels and the programs. The PSIP table is an advanced television systems committee (ATSC) standard that can identify the channels and the programs. The PSI table may include a program association table (PAT), a conditional access table (CAT), a program map table (PMT), and a network information table (NIT). Herein, the PAT corresponds to special information that is transmitted by a data packet having a PID of '0'. The PAT transmits PID information of the PMT and PID information of the NIT corresponding to each program. The CAT transmits information on a paid broadcast system used by the transmitting system. The PMT transmits PID information of a transport stream (TS) packet, in which program identification numbers and individual bit sequences of video and audio data configuring the corresponding program are transmitted, and the PID information, in which PCR is transmitted. The NIT transmits information of the actual transmission network.

The PSIP table may include a virtual channel table (VCT), a system time table (STT), a rating region table (RRT), an extended text table (ETT), a direct channel change table (DCCT), an event information table (EIT), and a master guide table (MGT). The VCT transmits information on virtual channels, such as channel information for selecting channels and information such as packet identification (PID) numbers for receiving the audio and/or video data. More specifically, when the VCT is parsed, the PID of the audio/video data of the broadcast program may be known. Herein, the corresponding audio/video data are transmitted within the channel along with the channel name and the channel number. The STT transmits information on the current data and timing information. The RRT transmits information on region and consultation organs for program ratings. The ETT transmits additional description of a specific channel and broadcast program. The ETT transmits information on virtual channel events (e.g., program title, program start time, etc.). The DCCT/DCCSCT transmits information associated with automatic (or direct) channel change. And, the MGT transmits the versions and PID information of the above-mentioned tables included in the PSIP.

Each of the above-described tables included in the PSI/PSIP is configured of a basic unit referred to as a "section", and a combination of one or more sections forms a table. For example, the VCT may be divided into 256 sections. Herein, one section may include a plurality of virtual channel information. However, a single set of virtual channel information is not divided into two or more sections. At this point, the receiving system may parse and decode the data for the data service that are transmitting by using only the tables included in the PSI, or only the tables included in the PISP, or a combination of tables included in both the PSI and the PSIP. In order to parse and decode the data for the data service, at least one of the PAT and PMT included in the PSI, and the VCT included in the PSIP is required. For example, the PAT may include the system information for transmitting the data corresponding to the data service, and the PID of the PMT corresponding to the data service data (or program number). The PMT may include the PID of the TS packet used for transmitting the data service data. The VCT may include information on the virtual channel for transmitting the data service data, and the PID of the TS packet for transmitting the data service data.

Meanwhile, depending upon the embodiment of the present invention, a DVB-SI may be applied instead of the PSIP. The DVB-SI may include a network information table (NIT), a service description table (SDT), an event information table (EIT), and a time and data table (TDT). The DVB-SI may be used in combination with the above-described PSI. Herein, the NIT divides the services corresponding to particular network providers by specific groups. The NIT includes all tuning information that are used during the IRD set-up. The NIT may be used for informing or notifying any change in the tuning information. The SDT includes the service name and different parameters associated with each service corresponding to a particular MPEG multiplex. The EIT is used for transmitting information associated with all events occurring in the MPEG multiplex. The EIT includes information on the current transmission and also includes information selectively containing different transmission streams that may be received by the IRD. And, the TDT is used for updating the clock included in the IRD.

Furthermore, three selective SI tables (i.e., a bouquet associate table (BAT), a running status table (RST), and a stuffing table (ST)) may also be included. More specifically, the bouquet associate table (BAT) provides a service grouping method enabling the IRD to provide services to the viewers. Each specific service may belong to at least one 'bouquet' unit. A running status table (RST) section is used for promptly and instantly updating at least one event execution status. The execution status section is transmitted only once at the changing point of the event status. Other SI tables are generally transmitted several times. The stuffing table (ST) may be used for replacing or discarding a subsidiary table or the entire SI tables.

In the present invention, the enhanced data included in the payload within the TS packet consist of a digital storage media-command and control (DSM-CC) section format.

However, the TS packet including the data service data may correspond either to a packetized elementary stream (PES) type or to a section type. More specifically, either the PES type data service data configure the TS packet, or the section type data service data configure the TS packet. The TS packet configured of the section type data will be given as the example of the present invention. At this point, the data service data are includes in the digital storage media-command and control (DSM-CC) section. Herein, the DSM-CC section is then configured of a 188-byte unit TS packet.

Furthermore, the packet identification of the TS packet configuring the DSM-CC section is included in a data service table (DST). When transmitting the DST, '0x95' is assigned as the value of a stream_type field included in the service location descriptor of the PMT or the VCT. More specifically, when the PMT or VCT stream_type field value is '0x95', the receiving system may acknowledge that data broadcasting including enhanced data (i.e., the enhanced data) is being received. At this point, the enhanced data may be transmitted by a data carousel method. The data carousel method corresponds to repeatedly transmitting identical data on a regular basis.

At this point, according to the control of the data decoder 710, the demultiplexer 703 performs section filtering, thereby discarding repetitive sections and outputting only the non-repetitive sections to the data decoder 710. The demultiplexer 703 may also output only the sections configuring desired tables (e.g., VCT) to the data decoder 710 by section filtering. Herein, the VCT may include a specific descriptor for the enhanced data. However, the present invention does not exclude the possibilities of the enhanced data being included in other tables, such as the PMT. The section filtering method may include a method of verifying the PID of a table defined by the MGT, such as the VCT, prior to performing the section filtering process. Alternatively, the section filtering method may also include a method of directly performing the section filtering process without verifying the MGT, when the VCT includes a fixed PID (i.e., a base PID). At this point, the demultiplexer 703 performs the section filtering process by referring to a table_id field, a version_number field, a section_number field, etc.

As described above, the method of defining the PID of the VCT broadly includes two different methods. Herein, the PID of the VCT is a packet identifier required for identifying the VCT from other tables. The first method consists of setting the PID of the VCT so that it is dependent to the MGT. In this case, the receiving system cannot directly verify the VCT among the many PSI and/or PSIP tables. Instead, the receiving system must check the PID defined in the MGT in order to read the VCT. Herein, the MGT defines the PID, size, version number, and so on, of diverse tables. The second method consists of setting the PID of the VCT so that the PID is given a base PID value (or a fixed PID value), thereby being independent from the MGT. In this case, unlike in the first method, the VCT according to the present invention may be identified without having to verify every single PID included in the MGT. Evidently, an agreement on the base PID must be previously made between the transmitting system and the receiving system.

Meanwhile, in the embodiment of the present invention, the demultiplexer 703 may output only an application information table (AIT) to the data decoder 710 by section filtering. The AIT includes information on an application being operated in the receiver for the data service. The AIT may also be referred to as an XAIT, and an AMT. Therefore, any table including application information may correspond to the following description. When the AIT is transmitted, a value of '0x05' may be assigned to a stream_type field of the PMT. The AIT may include application information, such as application name, application version, application priority, application ID, application status (i.e., auto-start, user-specific settings, kill, etc.), application type (i.e., Java or HTML), position (or location) of stream including application class and data files, application platform directory, and location of application icon.

In the method for detecting application information for the data service by using the AIT, component_tag, original_network_id, transport_stream_id, and service_id fields may be used for detecting the application information. The component_tag field designates an elementary stream carrying a DSI of a corresponding object carousel. The original_network_id field indicates a DVB-SI original_network_id of the TS providing transport connection. The transport_stream_id field indicates the MPEG TS of the TS providing transport connection, and the service_id field indicates the DVB-SI of the service providing transport connection. Information on a specific channel may be obtained by using the original_network_id field, the transport_stream_id field, and the service_id field. The data service data, such as the application data, detected by using the above-described method may be stored in the second memory 711 by the data decoder 710.

The data decoder 710 parses the DSM-CC section configuring the demultiplexed enhanced data. Then, the enhanced data corresponding to the parsed result are stored as a database in the second memory 711. The data decoder 710 groups a plurality of sections having the same table identification (table_id) so as to configure a table, which is then parsed. Thereafter, the parsed result is stored as a database in the second memory 711. At this point, by parsing data and/or sections, the data decoder 710 reads all of the remaining actual section data that are not section-filtered by the demultiplexer 703. Then, the data decoder 710 stores the read data to the second memory 711. The second memory 711 corresponds to a table and data carousel database storing system information parsed from tables and enhanced data parsed from the DSM-CC section. Herein, a table_id field, a section_number field, and a last_section_number field included in the table may be used to indicate whether the corresponding table is configured of a single section or a plurality of sections. For example, TS packets having the PID of the VCT are grouped to form a section, and sections having table identifiers allocated to the VCT are grouped to form the VCT.

When the VCT is parsed, information on the virtual channel to which enhanced data are transmitted may be obtained. The obtained application identification information, service component identification information, and service information corresponding to the data service may either be stored in the second memory 711 or be outputted to the data broadcasting application manager 713. In addition, reference may be made to the application identification information, service component identification information, and service information in order to decode the data service data. Alternatively, such information may also prepare the operation of the application program for the data service. Furthermore, the data decoder 710 controls the demultiplexing of the system information table, which corresponds to the information table associated with the channel and events. Thereafter, an A.V PID list may be transmitted to the channel manager 707.

The channel manager 707 may refer to the channel map 708 in order to transmit a request for receiving system-related information data to the data decoder 710, thereby receiving the corresponding result. In addition, the channel manager 707 may also control the channel tuning of the tuner 701.

Furthermore, the channel manager 707 may directly control the demultiplexer 703, so as to set up the A/V PID, thereby controlling the audio decoder 704 and the video decoder 705. The audio decoder 704 and the video decoder 705 may respectively decode and output the audio data and video data demultiplexed from the main data packet. Alternatively, the audio decoder 704 and the video decoder 705 may respectively decode and output the audio data and video data demultiplexed from the enhanced data packet. Meanwhile, when the enhanced data include data service data, and also audio data and video data, it is apparent that the audio data and video data demultiplexed by the demultiplexer 703 are respectively decoded by the audio decoder 704 and the video decoder 705. For example, an audio-coding (AC)-3 decoding algorithm may be applied to the audio decoder 704, and a MPEG-2 decoding algorithm may be applied to the video decoder 705.

Meanwhile, the native TV application manager 706 operates a native application program stored in the first memory 709, thereby performing general functions such as channel change. The native application program refers to software stored in the receiving system upon shipping of the product. More specifically, when a user request (or command) is transmitted to the receiving system through a user interface (UI), the native TV application manger 706 displays the user request on a screen through a graphic user interface (GUI), thereby responding to the user's request. The user interface receives the user request through an input device, such as a remote controller, a key pad, a jog controller, an a touch-screen provided on the screen, and then outputs the received user request to the native TV application manager 706 and the data broadcasting application manager 713. Furthermore, the native TV application manager 706 controls the channel manager 707, thereby controlling channel-associated, such as the management of the channel map 708, and controlling the data decoder 710. The native TV application manager 706 also controls the GUI of the overall receiving system, thereby storing the user request and status of the receiving system in the first memory 709 and restoring the stored information.

The channel manager 707 controls the tuner 701 and the data decoder 710, so as to managing the channel map 708 so that it can respond to the channel request made by the user. More specifically, channel manager 707 sends a request to the data decoder 710 so that the tables associated with the channels that are to be tuned are parsed. The results of the parsed tables are reported to the channel manager 707 by the data decoder 710. Thereafter, based on the parsed results, the channel manager 707 updates the channel map 708 and sets up a PID in the demultiplexer 703 for demultiplexing the tables associated with the data service data from the enhanced data.

The system manager 712 controls the booting of the receiving system by turning the power on or off. Then, the system manager 712 stores ROM images (including downloaded software images) in the first memory 709. More specifically, the first memory 709 stores management programs such as operating system (OS) programs required for managing the receiving system and also application program executing data service functions. The application program is a program processing the data service data stored in the second memory 711 so as to provide the user with the data service. If the data service data are stored in the second memory 711, the corresponding data service data are processed by the above-described application program or by other application programs, thereby being provided to the user. The management program and application program stored in the first memory 709 may be updated or corrected to a newly downloaded program. Furthermore, the storage of the stored management program and application program is maintained without being deleted even if the power of the system is shut down. Therefore, when the power is supplied the programs may be executed without having to be newly downloaded once again.

The application program for providing data service according to the present invention may either be initially stored in the first memory 709 upon the shipping of the receiving system, or be stored in the first 709 after being downloaded. The application program for the data service (i.e., the data service providing application program) stored in the first memory 709 may also be deleted, updated, and corrected. Furthermore, the data service providing application program may be downloaded and executed along with the data service data each time the data service data are being received.

When a data service request is transmitted through the user interface, the data broadcasting application manager 713 operates the corresponding application program stored in the first memory 709 so as to process the requested data, thereby providing the user with the requested data service. And, in order to provide such data service, the data broadcasting application manager 713 supports the graphic user interface (GUI). Herein, the data service may be provided in the form of text (or short message service (SMS)), voice message, still image, and moving image. The data broadcasting application manager 713 may be provided with a platform for executing the application program stored in the first memory 709. The platform may be, for example, a Java virtual machine for executing the Java program. Hereinafter, an example of the data broadcasting application manager 713 executing the data service providing application program stored in the first memory 709, so as to process the data service data stored in the second memory 711, thereby providing the user with the corresponding data service will now be described in detail.

Assuming that the data service corresponds to a traffic information service, the data service according to the present invention is provided to the user of a receiver that is not equipped with an electronic map and/or a GPS system in the form of at least one of a text (or short message service (SMS)), a voice message, a graphic message, a still image, and a moving image. In this case, is a GPS module is mounted on the receiving system shown in FIG. 9, the GPS module receives satellite signals transmitted from a plurality of low earth orbit satellites and extracts the current position (or location) information (e.g., longitude, latitude, altitude), thereby outputting the extracted information to the data broadcasting application manager 713.

At this point, it is assumed that the electronic map including information on each link and nod and other diverse graphic information are stored in one of the second memory 711, the first memory 709, and another memory that is not shown. More specifically, according to the request made by the data broadcasting application manager 713, the data service data stored in the second memory 711 are read and inputted to the data broadcasting application manager 713. The data broadcasting application manager 713 translates (or deciphers) the data service data read from the second memory 711, thereby extracting the necessary information according to the contents of the message and/or a control signal.

Figure 10:
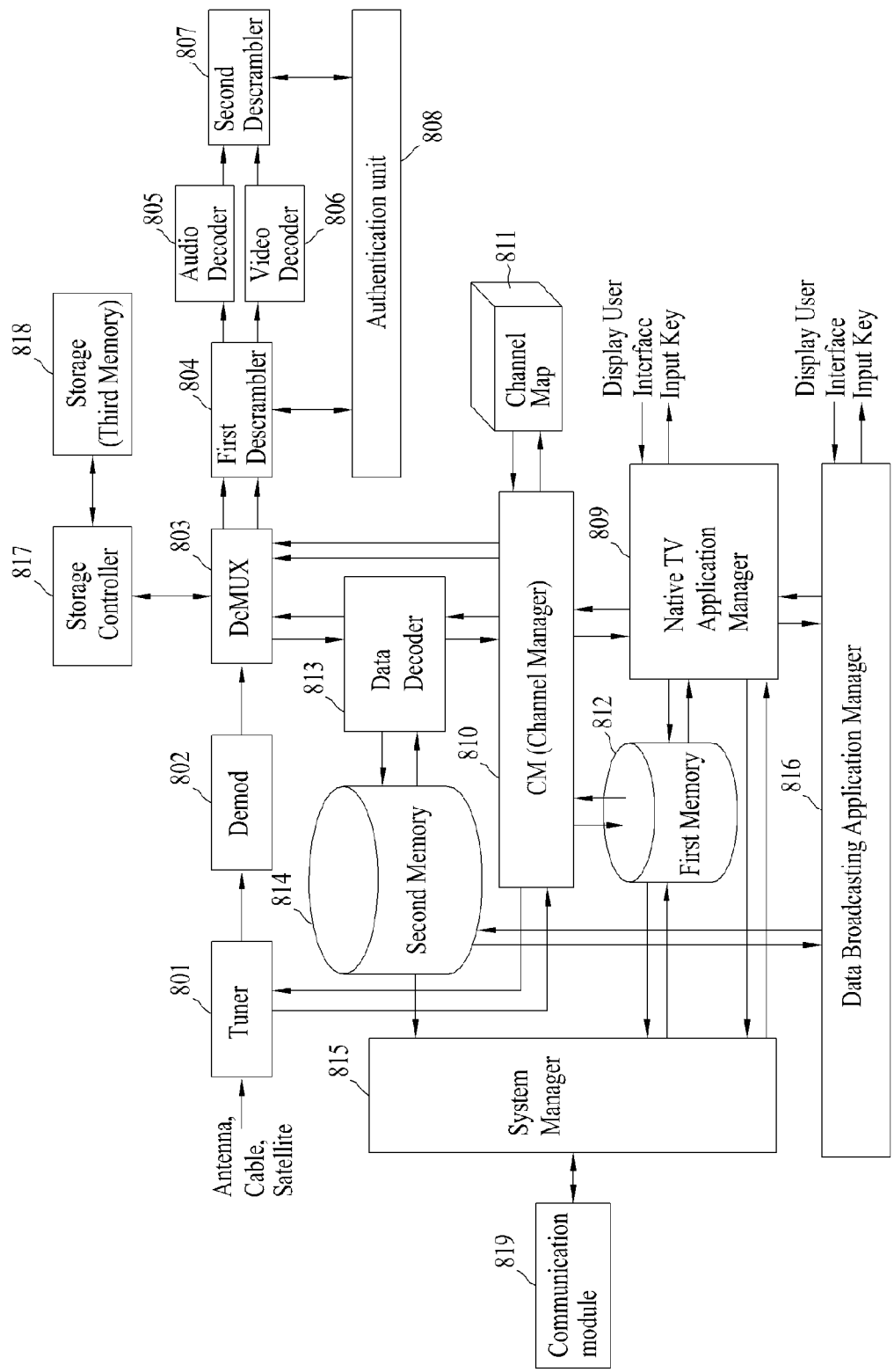
FIG. 10 illustrates a block view showing the structure of a digital broadcast (or television) receiver according to another embodiment of the present invention.

FIG. 10 illustrates a block view showing the structure of a digital broadcast (or television) receiver according to another embodiment of the present invention. Referring to FIG. 10, the digital broadcast receiver includes a tuner 801, a demodulating unit 802, a demultiplexer 803, a first descrambler 804, an audio decoder 805, a video decoder 806, a second descrambler 807, an authentication unit 808, a native TV application manager 809, a channel manager 810, a channel map 811, a first memory 812, a data decoder 813, a second memory 814, a system manager 815, a data broadcasting application manager 816, a storage controller 817, a third memory 818, and a telecommunication module 819. Herein, the third memory 818 is a mass storage device, such as a hard disk drive (HDD) or a memory chip. Also, during the description of the digital broadcast (or television) receiver shown in FIG. 10, the components that are identical to those of the digital broadcast receiver of FIG. 9 will be omitted for simplicity.

As described above, in order to provide services for preventing illegal duplication (or copies) or illegal viewing of the enhanced data and/or main data that are transmitted by using a broadcast network, and to provide paid broadcast services, the transmitting system may generally scramble and transmit the broadcast contents. Therefore, the receiving system needs to descrample the scrambled broadcast contents in order to provide the user with the proper broadcast contents. Furthermore, the receiving system may generally be processed with an authentication process with an authentication means before the descrambling process. Hereinafter, the receiving system including an authentication means and a descrambling means according to an embodiment of the present invention will now be described in detail.

According to the present invention, the receiving system may be provided with a descrambling means receiving scrambled broadcasting contents and an authentication means authenticating (or verifying) whether the receiving system is entitled to receive the descrambled contents. Hereinafter, the descrambling means will be referred to as first and second descramblers 804 and 807, and the authentication means will be referred to as an authentication unit 808. Such naming of the corresponding components is merely exemplary and is not limited to the terms suggested in the description of the present invention. For example, the units may also be referred to as a decryptor. Although FIG. 10 illustrates an example of the descramblers 804 and 807 and the authentication unit 808 being provided inside the receiving system, each of the descramblers 804 and 807 and the authentication unit 808 may also be separately provided in an internal or external module. Herein, the module may include a slot type, such as a SD or CF memory, a memory stick type, a USB type, and so on, and may be detachably fixed to the receiving system.

As described above, when the authentication process is performed successfully by the authentication unit 808, the scrambled broadcasting contents are descrambled by the descramblers 804 and 807, thereby being provided to the user. At this point, a variety of the authentication method and descrambling method may be used herein. However, an agreement on each corresponding method should be made between the receiving system and the transmitting system. Hereinafter, the authentication and descrambling methods will now be described, and the description of identical components or process steps will be omitted for simplicity.

The receiving system including the authentication unit 808 and the descramblers 804 and 807 will now be described in detail. The receiving system receives the scrambled broadcasting contents through the tuner 801 and the demodulating unit 802. Then, the system manager 815 decides whether the received broadcasting contents have been scrambled. Herein, the demodulating unit 802 may be included as a demodulating means according to an embodiment of the present invention as described in FIG. 11. However, the present invention is not limited to the examples given in the description set forth herein. If the system manager 815 decides that the received broadcasting contents have been scrambled, then the system manager 815 controls the system to operate the authentication unit 808. As described above, the authentication unit 808 performs an authentication process in order to decide whether the receiving system according to the present invention corresponds to a legitimate host entitled to receive the paid broadcasting service. Herein, the authentication process may vary in accordance with the authentication methods.

For example, the authentication unit 808 may perform the authentication process by comparing an IP address of an IP datagram within the received broadcasting contents with a specific address of a corresponding host. At this point, the specific address of the corresponding receiving system (or host) may be a MAC address. More specifically, the authentication unit 808 may extract the IP address from the decapsulated IP datagram, thereby obtaining the receiving system information that is mapped with the IP address. At this point, the receiving system should be provided, in advance, with information (e.g., a table format) that can map the IP address and the receiving system information. Accordingly, the authentication unit 808 performs the authentication process by determining the conformity between the address of the corresponding receiving system and the system information of the receiving system that is mapped with the IP address. In other words, if the authentication unit 808 determines that the two types of information conform to one another, then the authentication unit 808 determines that the receiving system is entitled to receive the corresponding broadcasting contents.

In another example, standardized identification information is defined in advance by the receiving system and the transmitting system. Then, the identification information of the receiving system requesting the paid broadcasting service is transmitted by the transmitting system. Thereafter, the receiving system determines whether the received identification information conforms with its own unique identification number, so as to perform the authentication process. More specifically, the transmitting system creates a database for storing the identification information (or number) of the receiving system requesting the paid broadcasting service. Then, if the corresponding broadcasting contents are scrambled, the transmitting system includes the identification information in the EMM, which is then transmitted to the receiving system.

If the corresponding broadcasting contents are scrambled, messages (e.g., entitlement control message (ECM), entitlement management message (EMM)), such as the CAS information, mode information, message position information, that are applied to the scrambling of the broadcasting contents are transmitted through a corresponding data header or anther data packet. The ECM may include a control word (CW) used for scrambling the broadcasting contents. At this point, the control word may be encoded with an authentication key. The EMM may include an authentication key and entitlement information of the corresponding data. Herein, the authentication key may be encoded with a receiver-specific distribution key. In other words, assuming that the enhanced data are scrambled by using the control word, and that the authentication information and the descrambling information are transmitted from the transmitting system, the transmitting system encodes the CW with the authentication key and, then, includes the encoded CW in the entitlement control message (ECM), which is then transmitted to the receiving system. Furthermore, the transmitting system includes the authentication key used for encoding the CW and the entitlement to receive data (or services) of the receiving system (i.e., a standardized serial number of the receiving system that is entitled to receive the corresponding broadcasting service or data) in the entitlement management message (EMM), which is then transmitted to the receiving system.

Accordingly, the authentication unit 808 of the receiving system extracts the identification information of the receiving system and the identification information included in the EMM of the broadcasting service that is being received. Then, the authentication unit 808 determines whether the identification information conform to each other, so as to perform the authentication process. MOTE specifically, if the authentication unit 808 determines that the information conform to each other, then the authentication unit 808 eventually determines that the receiving system is entitled to receive the request broadcasting service.

In yet another example, the authentication unit 808 of the receiving system may be detachably fixed to an external module. In this case, the receiving system is interfaced with the external module through a common interface (CI). In other words, the external module may receive the data scrambled by the receiving system through the common interface, thereby performing the descrambling process of the received data. Alternatively, the external module may also transmit only the information required for the descrambling process to the receiving system. The common interface is configured on a physical layer and at least one protocol layer. Herein, in consideration of any possible expansion of the protocol layer in a later process, the corresponding protocol layer may be configured to have at least one layer that can each provide an independent function.

The external module may either consist of a memory or card having information on the key used for the scrambling process and other authentication information but not including any descrambling function, or consist of a card having the above-mentioned key information and authentication information and including the descrambling function. Both the receiving system and the external module should be authenticated in order to provide the user with the paid broadcasting service provided (or transmitted) from the transmitting system. Therefore, the transmitting system can only provide the corresponding paid broadcasting service to the authenticated pair of receiving system and external module.

Additionally, an authentication process should also be performed between the receiving system and the external module through the common interface. More specifically, the module may communicate with the system manager 815 included in the receiving system through the common interface, thereby authenticating the receiving system. Alternatively, the receiving system may authenticate the module through the common interface. Furthermore, during the authentication process, the module may extract the unique ID of the receiving system and its own unique ID and transmit the extracted IDs to the transmitting system. Thus, the transmitting system may use the transmitted ID values as information determining whether to start the requested service or as payment information. Whenever necessary, the system manager 815 transmits the payment information to the remote transmitting system through the telecommunication module 819.

The authentication unit 808 authenticates the corresponding receiving system and/or the external module. Then, if the authentication process is successfully completed, the authentication unit 808 certifies the corresponding receiving system and/or the external module as a legitimate system and/or module entitled to receive the requested paid broadcasting service. In addition, the authentication unit 808 may also receive authentication-associated information from a mobile telecommunications service provider to which the user of the receiving system is subscribed, instead of the transmitting system providing the requested broadcasting service. In this case, the authentication-association information may either be scrambled by the transmitting system providing the broadcasting service and, then, transmitted to the user through the mobile telecommunications service provider, or be directly scrambled and transmitted by the mobile telecommunications service provider. Once the authentication process is successfully completed by the authentication unit 808, the receiving system may descramble the scrambled broadcasting contents received from the transmitting system. At this point, the descrambling process is performed by the first and second descramblers 804 and 807. Herein, the first and second descramblers 804 and 807 may be included in an internal module or an external module of the receiving system.

The receiving system is also provided with a common interface for communicating with the external module including the first and second descramblers 804 and 807, so as to perform the descrambling process. More specifically, the first and second descramblers 804 and 807 may be included in the module or in the receiving system in the form of hardware, middleware or software. Herein, the descramblers 804 and 807 may be included in any one of or both of the module and the receiving system. If the first and second descramblers 804 and 807 are provided inside the receiving system, it is advantageous to have the transmitting system (i.e., at least any one of a service provider and a broadcast station) scramble the corresponding data using the same scrambling method.

Alternatively, if the first and second descramblers 804 and 807 are provided in the external module, it is advantageous to have each transmitting system scramble the corresponding data using different scrambling methods. In this case, the receiving system is not required to be provided with the descrambling algorithm corresponding to each transmitting system. Therefore, the structure and size of receiving system may be simplified and more compact. Accordingly, in this case, the external module itself may be able to provide CA functions, which are uniquely and only provided by each transmitting systems, and functions related to each service that is to be provided to the user. The common interface enables the various external modules and the system manager 815, which is included in the receiving system, to communicate with one another by a single communication method. Furthermore, since the receiving system may be operated by being connected with at least one or more modules providing different services, the receiving system may be connected to a plurality of modules and controllers.

In order to maintain successful communication between the receiving system and the external module, the common interface protocol includes a function of periodically checking the status of the opposite correspondent. By using this function, the receiving system and the external module is capable of managing the status of each opposite correspondent. This function also reports the user or the transmitting system of any malfunction that may occur in any one of the receiving system and the external module and attempts the recovery of the malfunction.

In yet another example, the authentication process may be performed through software. More specifically, when a memory card having CAS software downloaded, for example, and stored therein in advanced is inserted in the receiving system, the receiving system receives and loads the CAS software from the memory card so as to perform the authentication process. In this example, the CAS software is read out from the memory card and stored in the first memory 812 of the receiving system. Thereafter, the CAS software is operated in the receiving system as an application program. According to an embodiment of the present invention, the CAS software is mounted on for stored) in a middleware platform and, then executed. A Java middleware will be given as an example of the middleware included in the present invention. Herein, the CAS software should at least include information required for the authentication process and also information required for the descrambling process.

Therefore, the authentication unit 808 performs authentication processes between the transmitting system and the receiving system and also between the receiving system and the memory card. At this point, as described above, the memory card should be entitled to receive the corresponding data and should include information on a normal receiving system that can be authenticated. For example, information on the receiving system may include a unique number, such as a standardized serial number of the corresponding receiving system. Accordingly, the authentication unit 808 compares the standardized serial number included in the memory card with the unique information of the receiving system, thereby performing the authentication process between the receiving system and the memory card.

If the CAS software is first executed in the Java middleware base, then the authentication between the receiving system and the memory card is performed. For example, when the unique number of the receiving system stored in the memory card conforms to the unique number of the receiving system read from the system manager 815, then the memory card is verified and determined to be a normal memory card that may be used in the receiving system. At this point, the CAS software may either be installed in the first memory 812 upon the shipping of the present invention, or be downloaded to the first memory 812 from the transmitting system or the module or memory card, as described above. Herein, the descrambling function may be operated by the data broadcasting application manger 816 as an application program.

Thereafter, the CAS software parses the EMM/ECM packets outputted from the demultiplexer 803, so as to verify whether the receiving system is entitled to receive the corresponding data, thereby obtaining the information required for descrambling (i.e., the CW) and providing the obtained CW to the descramblers 804 and 807. More specifically, the CAS software operating in the Java middleware platform first reads out the unique (or serial) number of the receiving system from the corresponding receiving system and compares it with the unique number of the receiving system transmitted through the EMM, thereby verifying whether the receiving system is entitled to receive the corresponding data. Once the receiving entitlement of the receiving system is verified, the corresponding broadcasting service information transmitted to the ECM and the entitlement of receiving the corresponding broadcasting service are used to verify whether the receiving system is entitled to receive the corresponding broadcasting service. Once the receiving system is verified to be entitled to receive the corresponding broadcasting service, the authentication key transmitted to the EMM is used to decode (or decipher) the encoded CW, which is transmitted to the ECM, thereby transmitting the decoded CW to the descramblers 804 and 807. Each of the descramblers 804 and 807 uses the CW to descramble the broadcasting service.

Meanwhile, the CAS software stored in the memory card may be expanded in accordance with the paid service which the broadcast station is to provide. Additionally, the CAS software may also include other additional information other than the information associated with the authentication and descrambling. Furthermore, the receiving system may download the CAS software from the transmitting system so as to upgrade (or update) the CAS software originally stored in the memory card. As described above, regardless of the type of broadcast receiver, as long as an external memory interface is provided, the present invention may embody a CAS system that can meet the requirements of all types of memory card that may be detachably fixed to the receiving system. Thus, the present invention may realize maximum performance of the receiving system with minimum fabrication cost, wherein the receiving system may receive paid broadcasting contents such as broadcast programs, thereby acknowledging and regarding the variety of the receiving system. Moreover, since only the minimum application program interface is required to be embodied in the embodiment of the present invention, the fabrication cost may be minimized, thereby eliminating the manufacturer's dependence on CAS manufacturers. Accordingly, fabrication costs of CAS equipments and management systems may also be minimized.

Meanwhile, the descramblers 804 and 807 may be included in the module either in the form of hardware or in the form of software. In this case, the scrambled data that being received are descrambled by the module and then demodulated. Also, if the scrambled data that are being received are stored in the third memory 818, the received data may be descrambled and then stored, or stored in the memory at the point of being received and then descrambled later on prior to being played (or reproduced). Thereafter, in case scramble/descramble algorithms are provided in the storage controller 817, the storage controller 817 scrambles the data that are being received once again and then stores the re-scrambled data to the third memory 818.

In yet another example, the descrambled broadcasting contents (transmission of which being restricted) are transmitted through the broadcasting network. Also, information associated with the authentication and descrambling of data in order to disable the receiving restrictions of the corresponding data are transmitted and/or received through the telecommunications module 819. Thus, the receiving system is able to perform reciprocal (or two-way) communication. The receiving system may either transmit data to the telecommunication module within the transmitting system or be provided with the data from the telecommunication module within the transmitting system. Herein, the data correspond to broadcasting data that are desired to be transmitted to or from the transmitting system, and also unique information (i.e., identification information) such as a serial number of the receiving system or MAC address.

The telecommunication module 819 included in the receiving system provides a protocol required for performing reciprocal (or two-way) communication between the receiving system, which does not support the reciprocal communication function, and the telecommunication module included in the transmitting system. Furthermore, the receiving system configures a protocol data unit (PDU) using a tag-length-value (TLV) coding method including the data that are to be transmitted and the unique information (or ID information). Herein, the tag field includes indexing of the corresponding PDU. The length field includes the length of the value field. And, the value field includes the actual data that are to be transmitted and the unique number (e.g., identification number) of the receiving system.

The receiving system may configure a platform that is equipped with the Java platform and that is operated after downloading the Java application of the transmitting system to the receiving system through the network. In this case, a structure of downloading the PDU including the tag field arbitrarily defined by the transmitting system from a storage means included in the receiving system and then transmitting the downloaded PDU to the telecommunication module 819 may also be configured. Also, the PDU may be configured in the Java application of the receiving system and then outputted to the telecommunication module 819. The PDU may also be configured by transmitting the tag value, the actual data that are to be transmitted, the unique information of the corresponding receiving system from the Java application and by performing the TLV coding process in the receiving system. This structure is advantageous in that the firmware of the receiving system is not required to be changed even if the data (or application) desired by the transmitting system is added.

The telecommunication module within the transmitting system either transmits the PDU received from the receiving system through a wireless data network or configures the data received through the network into a PDU which is transmitted to the host. At this point, when configuring the PDU that is to be transmitted to the host, the telecommunication module within the transmitting end may include unique information (e.g., IP address) of the transmitting system which is located in a remote location. Additionally, in receiving and transmitting data through the wireless data network, the receiving system may be provided with a common interface, and also provided with a WAP, CDMA 1x EV-DO, which can be connected through a mobile telecommunication base station, such as CDMA and GSM, and also provided with a wireless LAN, mobile Internet, WiBro, WiMax, which can be connected through an access point. The above-described receiving system corresponds to the system that is not equipped with a telecommunication function. However, a receiving system equipped with telecommunication function does not require the telecommunication module 819.

The broadcasting data being transmitted and received through the above-described wireless data network may include data required for performing the function of limiting data reception. Meanwhile, the demultiplexer 803 receives either the real-time data outputted from the demodulating unit 802 or the data read from the third memory 818, thereby performing demultiplexing. In this embodiment of the present invention, the demultiplexer 803 performs demultiplexing on the enhanced data packet. Similar process steps have already been described earlier in the description of the present invention. Therefore, a detailed of the process of demultiplexing the enhanced data will be omitted for simplicity.

The first descrambler 804 receives the demultiplexed signals from the demultiplexer 803 and then descrambles the received signals. At this point, the first descrambler 804 may receive the authentication result received from the authentication unit 808 and other data required for the descrambling process, so as to perform the descrambling process. The audio decoder 805 and the video decoder 806 receive the signals descrambled by the first descrambler 804, which are then decoded and outputted. Alternatively, if the first descrambler 804 did not perform the descrambling process, then the audio decoder 805 and the video decoder 806 directly decode and output the received signals. In this case, the decoded signals are received and then descrambled by the second descrambler 807 and processed accordingly.

As described above, the DTV transmitter and receiver, and data processing method according to the present invention have the following advantages. More specifically, the digital broadcast transmitting/receiving system and data processing method according to the present invention is highly protected against (or resistant to) any error that may occur when transmitting supplemental data through a channel. And, the present invention is also highly compatible to the conventional VSB receiving system. Moreover, the present invention may also receive the supplemental data without any error even in channels having severe ghost effect and noise.

Additionally, by inserting known data in a specific place (or position) of the data domain and transmitting the processed data, the receiving performance of the digital broadcast (or digital television) receiving system liable to a frequent change in channel may be enhanced. The present invention is even more effective when applied to mobile and portable receivers, which are also liable to a frequent change in channel and which require protection (or resistance) against intense noise. Furthermore, by regularly inserting and transmitting known data having identical patterns to the valid data, and by having the receiving end perform channel equalization in a circular convolution form, the structure of the channel equalizer is simplified, thereby enhancing the equalization performance.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A digital television (DTV) receiver comprising:
   a tuner for receiving a broadcast signal including main data, enhanced data and known data symbol sequences, wherein the main data and the enhanced data are interleaved, wherein at least two of the known data symbol sequences are regularly spaced in the interleaved main data and enhanced data of the received broadcast signal, and wherein at least one known data symbol sequence has a repeated pattern;
   a demodulator for demodulating the received broadcast signal by performing carrier recovery on the received broadcast signal based on the repeated pattern of the at least one known data symbol sequence;
   a channel equalizer for estimating a channel impulse response based on the known data symbol sequences which are regularly spaced in the interleaved main data and enhanced data of the demodulated broadcast signal and compensating channel distortion of the demodulated broadcast signal based on the estimated channel impulse response;
   a deinterleaver for deinterleaving the enhanced data in the compensated broadcast signal;
   a Reed-Solomon (RS) decoder for RS decoding the deinterleaved enhanced data; and
   a derandomizer for derandomizing the RS-decoded enhanced data.

2. The DTV receiver of claim 1, wherein the channel equalizer comprises:
   a first transformer for converting the demodulated broadcast signal into first frequency domain data;
   a channel estimator for estimating a channel impulse response using the known data symbol sequences which are regularly spaced in the interleaved main data and enhanced data of the first frequency domain data;
   a second transformer for converting the estimated channel impulse response into second frequency domain data;
   a calculator for calculating equalization coefficients based on the second frequency domain data;
   a compensator for compensating channel distortion of the first frequency domain data by multiplying the first frequency domain data with the equalization coefficients; and
   a third transformer for converting the compensated first frequency domain data into time domain data.

3. The DTV receiver of claim 2, wherein the first transformer converts the demodulated broadcast signal into the first frequency domain data using a fast Fourier transform (FFT).

4. The DTV receiver of claim 2, wherein the second transformer converts the estimated channel impulse response into the second frequency domain data using a fast Fourier transform (FFT).

5. The DTV receiver of claim 2, wherein the third transformer converts the compensated first frequency domain data into the time domain data using an inverse fast Fourier transform (IFFT).

6. A method of processing broadcast data in a digital television (DTV) receiver, the method comprising:
- receiving, by a tuner, a broadcast signal including main data, enhanced data and known data symbol sequences, wherein the main data and the enhanced data are interleaved, wherein at least two of the known data symbol sequences are regularly spaced in the interleaved main data and enhanced data of the received broadcast signal, and wherein at least one known data symbol sequence has a repeated pattern;
- demodulating, by a demodulator, the received broadcast signal by performing carrier recovery on the received broadcast signal based on the repeated pattern of the at least one known data symbol sequence;
- estimating, by a channel equalizer, a channel impulse response based on the known data symbol sequences which are regularly spaced in the interleaved main data and enhanced data in the demodulated broadcast signal and compensating channel distortion of the demodulated broadcast signal based on the estimated channel impulse response;
- deinterleaving, by a deinterleaver, the enhanced data in the compensated broadcast signal;
- Reed-Solomon (RS) decoding, by an RS decoder, the deinterleaved enhanced data; and
- derandomizing, by a derandomizer, the RS-decoded enhanced data.

7. The method of claim 6, wherein the channel equalizer comprises:
- a first transformer for converting the demodulated broadcast signal into first frequency domain data;
- a channel estimator for estimating a channel impulse response using the known data symbol sequences which are regularly spaced in the interleaved main data and enhanced data of the first frequency domain data;
- a second transformer for converting the estimated channel impulse response into second frequency domain data;
- a calculator for calculating equalization coefficients based on the second frequency domain data;
- a compensator for compensating channel distortion of the first frequency domain data by multiplying the first frequency domain data with the equalization coefficients; and
- a third transformer for converting the compensated first frequency domain data into time domain data.

8. The method of claim 7, wherein the first transformer converts the demodulated broadcast signal into the first frequency domain data using a fast Fourier transform (FFT).

9. The method of claim 7, wherein the second transformer converts the estimated channel impulse response into the second frequency domain data using a fast Fourier transform (FFT).

10. The method of claim 7, wherein the third transformer converts the compensated first frequency domain data into the time domain data using an inverse fast Fourier transform (IFFT).

* * * * *